(12) United States Patent
Mause et al.

(10) Patent No.: US 7,066,471 B2
(45) Date of Patent: Jun. 27, 2006

(54) LIP-TYPE SHAFT SEAL

(75) Inventors: Elmar Mause, Emskirchen (DE);
Harald Peschke, Veitsbronn (DE);
Wolfram Kruhöffer, Aurachtal (DE);
Thomas Traudt, Pegnitz (DE); Horst Krischer, Erlangen (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

(21) Appl. No.: 10/677,637

(22) Filed: Oct. 2, 2003

(65) Prior Publication Data

US 2004/0113366 A1 Jun. 17, 2004

(30) Foreign Application Priority Data

Oct. 4, 2002 (DE) ............................... 102 46 398

(51) Int. Cl.
*F16J 15/02* (2006.01)

(52) U.S. Cl. ........................ 277/560; 277/562

(58) Field of Classification Search ........ 277/349–353, 277/562–565, 560; 384/486, 544, 485
See application file for complete search history.

(56) References Cited

U.S. PATENT DOCUMENTS

| | | | | |
|---|---|---|---|---|
| 3,099,454 A | * | 7/1963 | Walinski ..................... | 277/570 |
| 3,929,340 A | * | 12/1975 | Peisker ....................... | 277/559 |
| 3,973,779 A | * | 8/1976 | Burgmann et al. .......... | 277/425 |
| 4,527,673 A | * | 7/1985 | Szcupak ..................... | 188/269 |
| 4,699,526 A | * | 10/1987 | Sato ........................... | 384/486 |
| 4,874,261 A | * | 10/1989 | Colanzi et al. ............. | 277/574 |
| 5,803,617 A | * | 9/1998 | Ohnuki et al. ............. | 384/486 |
| 5,944,321 A | * | 8/1999 | Niebling et al. ............ | 277/549 |
| 6,273,428 B1 | * | 8/2001 | Sassi ........................... | 277/348 |
| 6,746,018 B1 | * | 6/2004 | Lewis et al. ................ | 277/349 |
| 6,789,805 B1 | * | 9/2004 | Sassi ........................... | 277/549 |
| 2003/0128703 A1 | * | 7/2003 | Zhao et al. ................. | 370/392 |

FOREIGN PATENT DOCUMENTS

DE 38 43 337 A1 7/1989

* cited by examiner

*Primary Examiner*—Vishal Patel
(74) *Attorney, Agent, or Firm*—Henry M. Feiereisen (57) ABSTRACT

A lip-type shaft seal is made of elastic material with a Shore A hardness of $\leq 75$, includes a radial sealing lip, which has a sealing edge to bear against a rotating component and terminates in a axial sealing lip, which has a sealing edge to rests in installed state against a contact surface. The axial sealing lip extends at an angle of $\geq 35°$ in relation to a symmetry axis of the shaft seal, when the axial sealing lip has not been installed yet and is under no tension, and extends from the sealing edge of the radial sealing lip at a length of $\geq 1.4$ mm. When the shaft seal is installed, the axial sealing lip rests against the contact surface at an axial overlap of 0.05 to 0.55 mm.

37 Claims, 9 Drawing Sheets

LIP-TYPE SHAFT SEAL

CROSS-REFERENCES TO RELATED APPLICATIONS

This application claims the priority of German Patent Application, Serial No. 102 46 398.0, filed Oct. 4, 2002, pursuant to 35 U.S.C. 119(a)–(d), the disclosure of which is incorporated herein by reference.

BACKGROUND OF THE INVENTION

The present invention relates, in general, to a lip-type shaft seal.

Lip-type shaft seals are used to tightly seal pressure compartments from one another, and find in particular application in rolling-contact bearings of water circulating pumps for internal combustion engines, with the shaft seal being disposed between two components moving relative to one another. The shaft seal should hereby assume the task to prevent a penetration of water, vapor or similar fluids, such as coolant, and thus is required to effectively seal against the bearing surfaces throughout the service life of the rolling-contact bearing. An example of a lip-type shaft seal is described in German Pat. No. DE 38 43 337 A1. The shaft seal includes a seal body which is received in fixed rotative engagement in a groove and has a radial sealing lip terminating in an axial sealing lip. The radial sealing lip has a sealing edge which is acted upon by a spring element for support against a rotating shaft component which extends in the direction of a symmetry axis of the shaft seal. The axial sealing lip substantially overlaps a contact surface of a centrifugal sleeve. The relative short length of the axial sealing lip in concert with the substantial axial overlap between the axial sealing lip and the contact surface causes an increased pressure force which is accompanied by an inadmissible overheating. In particular, when high speeds are involved, wear is substantial and may ultimately lead to a "burning" of the sealing lip in the support zone, so that the operativeness of the shaft seal is adversely affected.

It would therefore be desirable and advantageous to provide an improved lip-type shaft seal to obviate prior art shortcomings and to construct it in a way that the support zones between the sealing lips and the opposing contact surfaces of the component interacting with the shaft seal are independent on the temperature and the rotation speed of the component.

SUMMARY OF THE INVENTION

According to one aspect of the present invention, a lip-type shaft seal for sealed separation of pressure compartments, in particular for sealing two components movable relative to one another, includes a seal body defining a symmetry axis and made of elastic material which has a Shore A hardness of $\leq 75$, wherein the seal body has a first radial sealing lip for placement in a pocket and terminating in a second axial sealing lip, with the radial sealing lip having a sealing edge and bearing upon a rotating component, which extends in a direction of the symmetry axis, and with the axial sealing lip having a sealing edge which, when installed, rests against a contact surface which is oriented radially to the symmetry axis, a spring element for supporting the radial sealing lip, and a reinforcing element integrated in a radial sealing portion of the seal body so as to be embraced by one side of the sealing portion, wherein the axial sealing lip extends at an angle of $\leq 35°$ in relation to the symmetry axis, when the axial sealing lip has not been installed yet and is under no tension, wherein the axial sealing lip extends from the sealing edge of the radial sealing lip over a length of $\geq 1.4$ mm, when the axial sealing lip has not been installed yet, and wherein the axial sealing lip rests against the contact surface at an axial overlap of 0.05 to 0.55 mm, when installed.

Through configuration of the shaft seal in accordance with the present invention, the overlap zone of the axial sealing lip is less sensitive to temperature changes between the axial sealing lip and the associated sealing surface, when installed. The wear resistance of the axial sealing lip is enhanced in the support zone, thereby improving the function and life of the axial sealing lip and thus of the entire shaft seal. As a consequence of the greater angular disposition of the axial sealing lip upon the pertaining contact surface and the extended configuration of the axial sealing lip, the elasticity of the axial sealing lip is also improved.

According to another feature of the present invention, the axial sealing lip may have an angled lip portion at a distance to the sealing edge of the radial sealing lip. The added angled configuration of the axial sealing lip affords a further enhancement of the elasticity and may extend radially outwards or radially inwards. When slanted radially inwards with respect to the remaining portion of the axial sealing lip, the angled lip portion extends at an angle of inclination of $\geq 60°$ in relation to a line which is oriented at a right angle to the symmetry axis. When slanted radially outwards, the angled lip portion extends at an angle of ascent of $\leq 40°$ in relation to a line which is oriented radially to the symmetry axis.

According to another feature of the present invention, the axial sealing lip may have a wall thickness which tapers from the sealing edge of the radial sealing lip from $\geq 0.9$ mm to $\geq 0.2$ mm, when the seal body is under no tension. A sealing lip configured in this manner is an optimum compromise between a sufficient strength and stiffness, on the one hand, and a desired elasticity, on the other hand.

According to another feature of the present invention, there may be provided a bending joint formed at a junction zone between the axial sealing lip and the angled lip portion, i.e. at the reversal point where a change in direction occurs between the angular disposition of the axial sealing lip, on the one hand, and the angle of ascent or angle of inclination of the angled lip portion, on the other hand. The bending joint may be implemented by an annular recess or groove, also called relief groove, which can be formed on an inside surface or outside surface of the junction zone and extends in a direction of the symmetry axis. Thus, a thinning of material of the axial sealing lip is realized to thereby provide an end zone of low flexural strength. As a result, the axial sealing lip can adjust in an optimum way to the associated contact surface, without exceeding an admissible support force. Suitably, the groove may also be used as a lubricant reservoir, when formed on the inside of the axial sealing lip. Through proper geometric configuration of the groove, e.g. a semi-round configuration of the groove, enables solid lubricant particles to remain in the groove, whereas oil fractions of the lubricant are moved radially outwards into the support zone of the axial sealing lip and its sealing edge to thereby ensure the formation of a required oil film between the sealing edge and the associated contact surface.

In order to minimize or limit the contact zone between the axial sealing lip and the associated contact surface, the contact surface is textured so as to reduce the support surface of the sealing lip. An example of a texture includes a honeycomb configuration that defines a geometric structure, preferably of arcuate shape, and is formed locally in the contact surface or, as an alternative, can jut out from the contact surface. A reduction of the contact surface decreases heat introduction into the axial sealing lip. Furthermore, the textured contact surface promotes the reception of lubricant and ensures the formation of a lubricating film, required for the service life of the axial sealing lip, between the sealing edge of the axial sealing lip and the associated contact surface.

As an alternative to the textured configuration of the contact surface, it is also possible to provide the axial sealing lip with a textured end surface in order to effectuate a reduced contact surface of the axial sealing lip in relation to the associated contact surface.

According to another feature of the present invention, at least the contact zone of the axial sealing lip with the associated contact surface may be lined with a coating. An example of a coating includes PTFE applied on the end surface of the sealing edge or the free end of the axial sealing lip. It may also be possible to coat at least a predetermined region of the contact surface in the area of the support of the axial sealing lip with a wear-inhibiting material. An example of a wear-inhibiting coating includes also PTFE. Optionally, the end surface of the axial sealing lip may also be coated with wear-inhibiting material.

According to another feature of the present invention, the axial sealing lip has an end zone which extends in a direction of the contact surface and may be formed on the inside with twist ribs to thereby improve the sealing action. The twist ribs are designed and disposed to ensure a return flow of lubricant towards the sealing gap to thereby improve the sealing action. Suitably, the axial sealing lip is constructed to effect a change in twist so that the shaft seal can be installed independently from the rotation direction. The change in twist may be realized by an arrow structure extending in the direction of the symmetry axis of the shaft seal and ensuring a return of lubricant regardless of the rotation direction.

According to another feature of the present invention, there may be provided a rotating centrifugal member for interaction with the axial sealing lip, when the shaft seal is installed. The shaft seal and the centrifugal member effectively seal in concert a circular ring shaped region between the outer bearing ring and a shaft. The centrifugal member is hereby securely fixed in place to the shaft and forms the contact surface for the axial sealing lip of the shaft seal. The centrifugal member may be constructed as a disk which extends radially to the outer surface area of the shaft. As an alternative, the centrifugal member may also be constructed of sleeve-like configuration so as to have an additional cylindrical portion which is disposed in surrounding relationship to the shaft and has an outer surface area which forms a contact surface for the radial sealing lip, whereas the radial portion of the centrifugal sleeve forms the contact surface for the axial sealing lip.

According to another feature of the present invention, the cylindrical portion of the centrifugal member may have an inner surface area which is formed with a slanted run-on surface to simplify a sequential assembly of the shaft seal and the centrifugal member, as it allows insertion of the shaft with associated centrifugal member into the rolling-contact bearing after assembly of the shaft seal. The slanted run-on surface permits a nondestructive installation of the radial sealing lip as the radial sealing lip is widened radially by the slanted run-on surface during axial insertion of the centrifugal member. Thus, there is no risk of damage or tear, when the radial sealing lip is installed onto the outer surface area of the cylindrical portion of the centrifugal member. Suitably, the outer slanted run-on surface is complemented by providing the cylindrical portion with an inner circumferential slanted run-on surface, or radius, or chamfer, to facilitate the attachment of the centrifugal member on the shaft.

According to another feature of the present invention, the radial sealing lip and/or the axial sealing lip may be provided with two or more sealing edges to thereby enhance the sealing action of the shaft seal. The provision of a sealing lip with several sealing edges enhances the sealing action as a result of the stepped configuration of the sealing edges, whereby the sealing edges may rest upon the contact surfaces with different forces. In this way, the sealing lip that applies a smaller support force assumes the function of a pre-seal for preventing contaminants or greater particles from penetrating the following sealing zone defined between the further sealing edge and the contact surface. As an alternative, the pre-seal can also be designed to extend just shy of the contact surface to thereby define a gap therebetween, when the shaft seal is assembled. This gap is hereby sized enough to allow the anterior sealing lip to prevent penetration of grease while allowing ingress of oil to form the lubricating film that is required for the service life of the sealing lip in sliding abutment with the contact surface. This construction is appropriate, for example, for shafts, which revolve at high speeds and are exposed to substantial stress, and thus is suitable for application in rolling-contact bearings which use grease as lubricant. As a consequence, the particular sealing lip construction, comprised of a sealing edge in sliding contact and a non-sliding sealing edge, allows a withdrawal of oil from the lubricant for use with the sliding sealing lip.

According to another feature of the present invention, the lip-type shaft seal includes a spring member which is urged against the radial sealing lip with a force. An example of a suitable spring element includes a garter spring with a diameter of $\leq 1.3$ mm, preferably $\leq 1.1$ mm. This slight diameter enables a construction of the garter spring that is best suited to the installation space and does not adversely affect the configuration of the axial sealing lip. In addition, the so-configured garter spring has a small spring mass which positively affects the installation, when the radial sealing lip is supported on a shaft that revolves at great speed. As a consequence of the small spring mass, the sealing lip is prevented from vibrating and ultimately from detaching from the outer surface area of the shaft.

As an alternative to the provision of a garter spring, the shaft seal may include a retaining ring which is under tension in radial direction and surrounds the radial sealing lip. The retaining ring may have a rectangular shape which extends radially to the outer surface area of the shaft, when installed, and requires only a small axial installation space in the area of the sealing edge of the radial sealing lip.

According to another feature of the present invention, the seal body of the lip-type shaft seal may be made of elastomer. Examples of an elastomer include HNBR (Hydrogenated Nitrile Butadiene Rubber) or a heat-resistant fluorocarbon rubber, as, for example, FPM or FKM. Regardless of the afore-stated materials, their Shore A hardness should be $\leq 75$.

A lip-type shaft seal is especially applicable for use as seal for a rolling-contact bearing in a water circulating pump of an internal combustion engine, in order to effectively seal a circular ring shaped region between a bearing ring in surrounding relationship to the rolling-contact bearing and the pump shaft. The shaft seal is snugly fitted in a pocket of the bearing ring and is supported with the sealing edge of a radial sealing lip upon the outer surface area of the shaft or a cylindrical portion of the centrifugal member arranged on the shaft. The other axial sealing lip of the shaft seal according to the invention is in sliding contact with a radial leg of the centrifugal sleeve or a contact surface of the shaft.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1a is an enlarged detailed view of an encircled area marked A in FIG. 1, illustrating the configuration of an end region of an axial sealing lip of the shaft seal;

FIG. 1b is an enlarged detailed view of the area in a direction of arrow H in FIG. 1a;

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
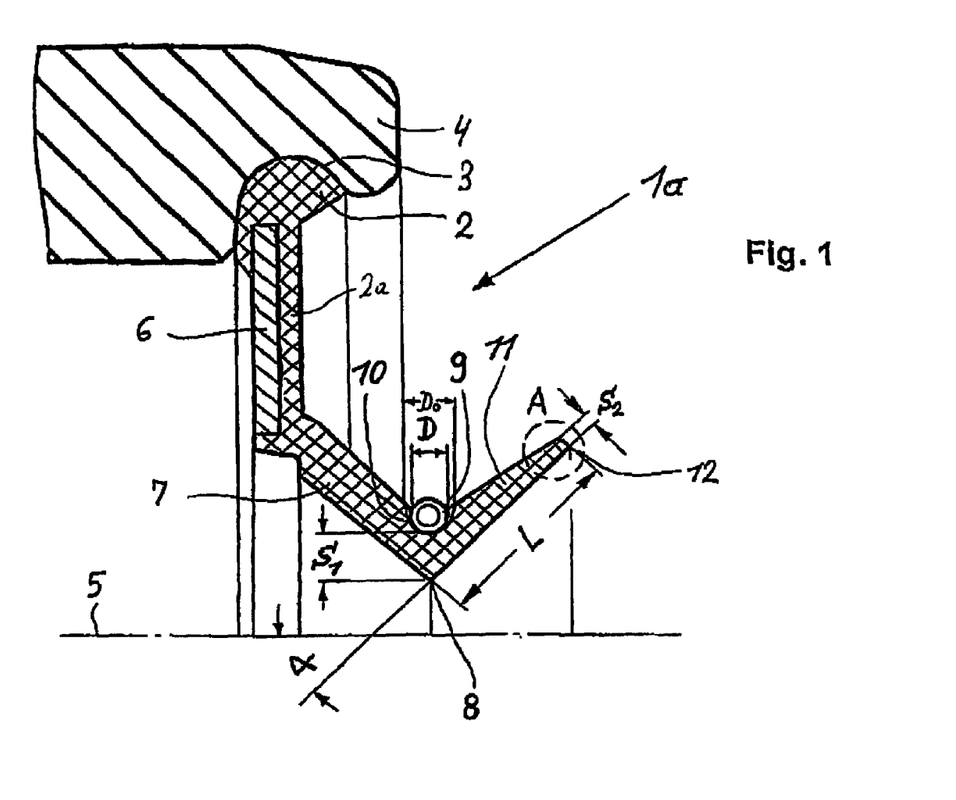
FIG. 1 is a half-section of a first embodiment of a lip-type shaft seal according to the present invention.

Turning now to the drawing, and in particular to FIG. 1, there is shown a half-section of a first embodiment of a lip-type shaft seal according to the present invention, generally designated by reference numeral 1a. The shaft seal 1a has a seal body made of elastic material with a Shore A hardness of $\leq 75$. Examples of elastomer include HNBR (Hydrogenated Nitrile Butadiene Rubber) or a heat-resistant fluorocarbon rubber, for example, FPM or FKM. The seal body of the shaft seal 1a includes a bulbed portion 2 for force-fitted and form-fitted engagement in a pocket 3 of a bearing ring 4, and includes in direction of a symmetry axis 5 a radial portion 2a which embraces a disk-shaped reinforcement 6 for stiffening the shaft seal 1a. The reinforcement 6 is thus covered at least on one side by the elastic material of the radial portion 2a of the shaft seal 1a. In the area of an inner contour of the reinforcement 6, the shaft seal 1a includes a radial sealing lip 7 which extends sideways at an angle of inclination towards the symmetry axis 5. The radial sealing lip 7 has a sealing edge 8 which rests snugly against an outer surface area of a not shown rotating component, e.g. a shaft, when the shaft seal 1a is installed. The sealing edge 8 is acted upon by a spring member in the form of a garter spring 9 which is placed in an annular groove 10 of the sealing lip 7 and increases the radial support force of the sealing lip 7. The radial sealing lip 7 terminates in an axial sealing lip 11 which extends at an angle α in relation to the symmetry axis 5. The axial sealing lip 11 has an end portion 11a to form a sealing edge 12 which bears snugly against a contact surface, or a shaft component, or a component separate from the shaft.

The shaft seal 1a according to the present invention is constructed to improve the elasticity of the axial sealing lip 11 in particular. Suitably, the angular disposition of the axial sealing lip 11 in relation to the symmetry axis 5 is $\alpha \geq 35°$. The axial sealing lip 11 has a length $L \geq 1.4$ mm, and a wall thickness which tapers continuously toward the end area 11a from a size $S_1 \geq 0.8$ mm, measured from the inner circumference of the garter spring 9 and the sealing edge 8, to a wall thickness $S_2 \geq 0.2$ mm at the free end of the sealing lip 11. The elasticity of the sealing lip 11 can further be enhanced by constructing the garter spring 9 (or worm spring) with a diameter $D \leq 1.3$ mm, while the annular groove 10 for accommodating the garter spring 9 has a size $D_0$, which is greater than the diameter D of the garter spring 9. As a consequence of the afore-stated constructive measures in conjunction with the use of a relative soft seal material, e.g. elastomer with a Shore A hardness of $\leq 75$, a defined axial overlap between the axial sealing lip 11 and a pertaining contact surface is realized at narrow tolerance, as will be described in more detail with reference to FIG. 5.

FIG. 1a is an enlarged detailed view of the encircled area marked A in FIG. 1, illustrating the configuration of the end region 11a of the axial sealing lip 11 of the shaft seal 1a. The end region 11a terminates in the sealing edge 12 which has an end surface 13 of textured configuration so as to decrease the contact area of the sealing edge 12 and to realize a reduced heat introduction from the contact surface into the axial sealing lip 11. This addresses wear concerns and positively affects the service life of the shaft seal 1a. In addition, or as an alternative to the textured end surface 13 or texture of the entire sealing edge 12, it is also conceivable to line the end region 11a with a wear-inhibiting coating, e.g. a PTFE coating.

Figure 1B:
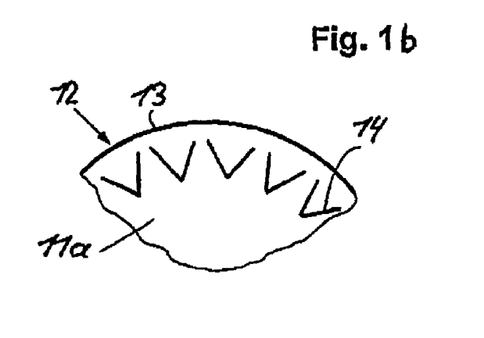

FIG. 1b shows an enlarged detailed view of the area in a direction of arrow H in FIG. 1a and illustrates in more detail the provision of a structure 14 in the form of a twist element to effect a change in twist on the inside surface of the axial sealing lip 11. The twist element 14 has a V-shaped configuration and improves the sealing action of the axial sealing lip 11 by preventing lubricant, accumulating on the inside of the axial sealing lip 11 to move unhindered radially outwards, when installed, but rather deflects it instead.

Figure 2:
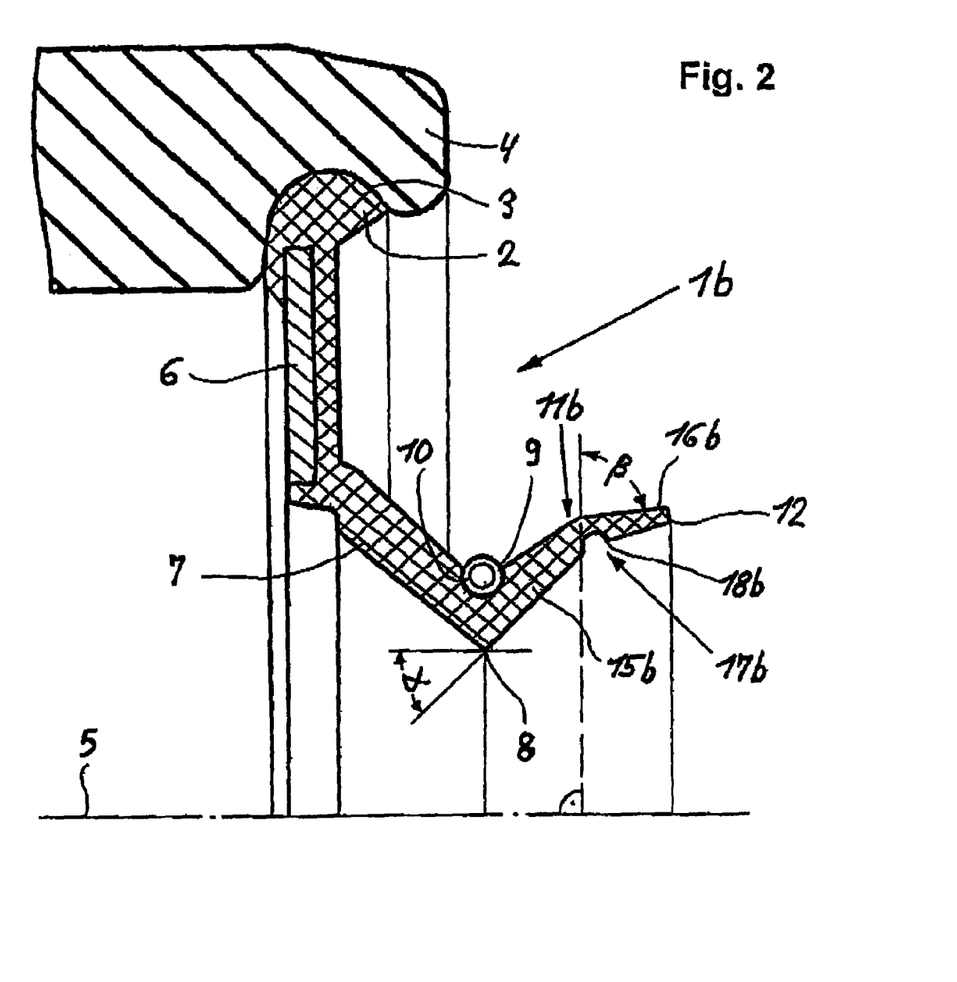
FIG. 2 is a half-section of another embodiment of a lip-type shaft seal according to the present invention.

Turning now to FIG. 2, there is shown a half-section of another embodiment of a lip-type shaft seal according to the present invention, generally designated by reference numeral 1b. Parts corresponding with those in FIG. 1 are denoted by identical reference numerals and not explained again. The description below will center on the differences between the embodiments. The shaft seal 1b has an axial sealing lip 11b which includes a first lip portion 15b, which extends at the angle α in relation to a line perpendicular to the symmetry axis 5, and a second angled lip portion 16b which extends at an angle of inclination β in relation to the symmetry axis 5. Formed between the lip portions 15b, 16b is a bending joint 17b which is realized by a circumferential flute 18b on the inside of the axial sealing lip 11b to thereby provide an intended material thinning of the sealing lip 11b for enhancing the elasticity of the sealing lip 11b in particular of the angled lip portion 16b, when installed.

Figure 2A:
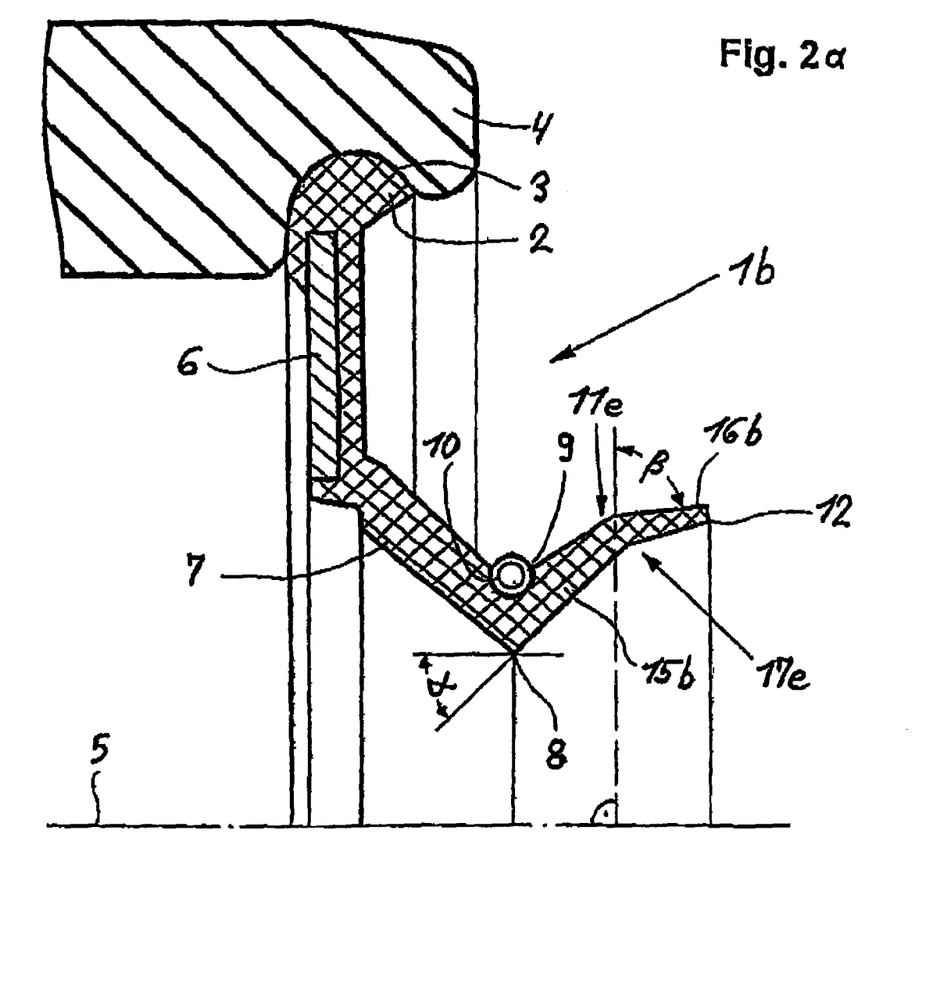
FIG. 2a is a half-section of a variation of the lip-type shaft seal of FIG. 2 in accordance with the present invention.

FIG. 2a shows is a half-section of a variation of the lip-type shaft seal 1b, with the difference residing only in the configuration of the bending joint 1e which in this embodiment is characterized by the absence of a flute.

Figure 3:
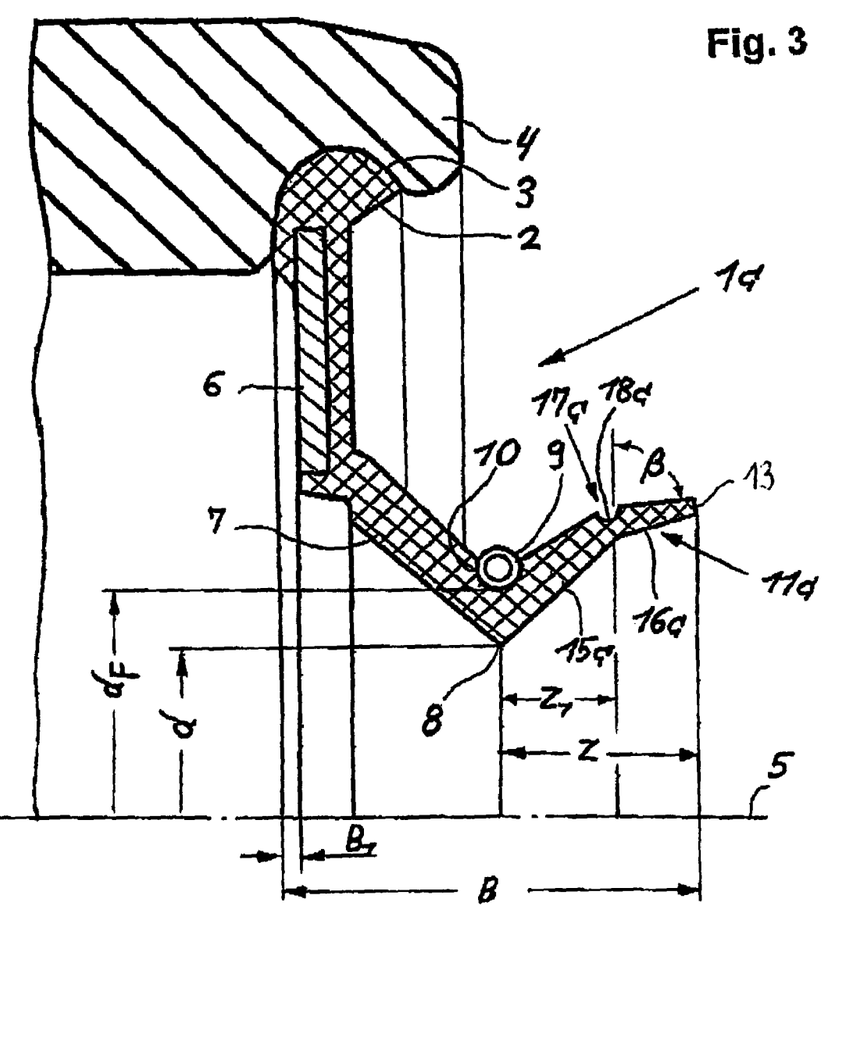
FIG. 3 is a half-section of another variation of the lip-type shaft seal of FIG. 2 in accordance with the present invention.

Turning now to FIG. 3, there is shown a half-section of another embodiment of a lip-type shaft seal according to the present invention, generally designated by reference numeral 1c. Parts corresponding with those in FIG. 1 are denoted by identical reference numerals and not explained again. The description below will center on the differences between the embodiments. The shaft seal 1c has an axial sealing lip 11c which includes a first lip portions 15c, which extends at the angle α in relation to the symmetry axis 5, and second angled lip portion 16c which extends at an angle of inclination β in relation to a line perpendicular to the symmetry axis 5. Formed between the lip portions 15c, 16c is a bending joint 17c which is realized by a circumferential flute 18c on the outside of the axial sealing lip 11c to thereby provide the intended material thinning of the sealing lip 11c for enhancing the elasticity of the sealing lip 11c in particular of the angled lip portion 16c, when installed. The bending joint 17c is disposed at a distance $Z_1$ to the sealing edge 8 of the radial sealing lip 7, whereby $Z_1 \geq Z$, with Z being an axial distance between the sealing edge 8 and the end surface 13 of the axial sealing lip 11c. In addition, the shaft seal 1c has an inside diameter $d \geq 16$ mm, when under no tension, whereas the inside diameter $d_F$ of the garter spring 9 is $\geq 17$ mm. The shaft seal 1c has a width $B \geq 3.2$ mm and an overhang $B_1 \geq 0.15$ mm, wherein $B_1$ is the axial distance between the reinforcement 6 and the bulbed portion 2.

Figure 4:
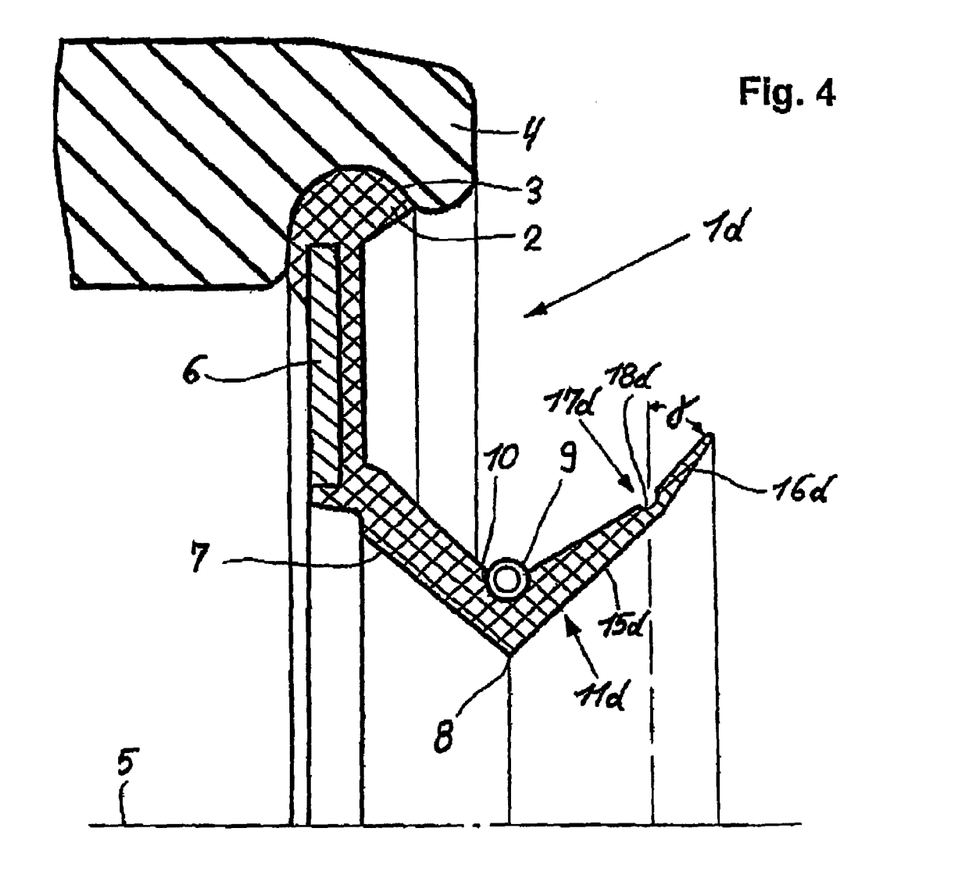
FIG. 4 is a half-section of a modification of the lip-type shaft seal of FIG. 3 in accordance with the present invention.

Turning now to FIG. 4, there is shown a half-section of another embodiment of a lip-type shaft seal according to the present invention, generally designated by reference numeral 1d. Parts corresponding with those in FIG. 1 are denoted by identical reference numerals and not explained again. The description below will center on the differences between the embodiments. The shaft seal 1d has an axial sealing lip 11d which includes a first lip portions 15d, which extends at the angle α in relation to the symmetry axis 5, and second angled lip portion 16d which extends outwards away from the symmetry axis 5 at the angle of inclination γ in relation to a line perpendicular to the symmetry axis 5. Formed between the lip portions 15d, 16d is a bending joint 17d which is realized by a circumferential flute 18d on the outside of the axial sealing lip 11d.

Figure 5:
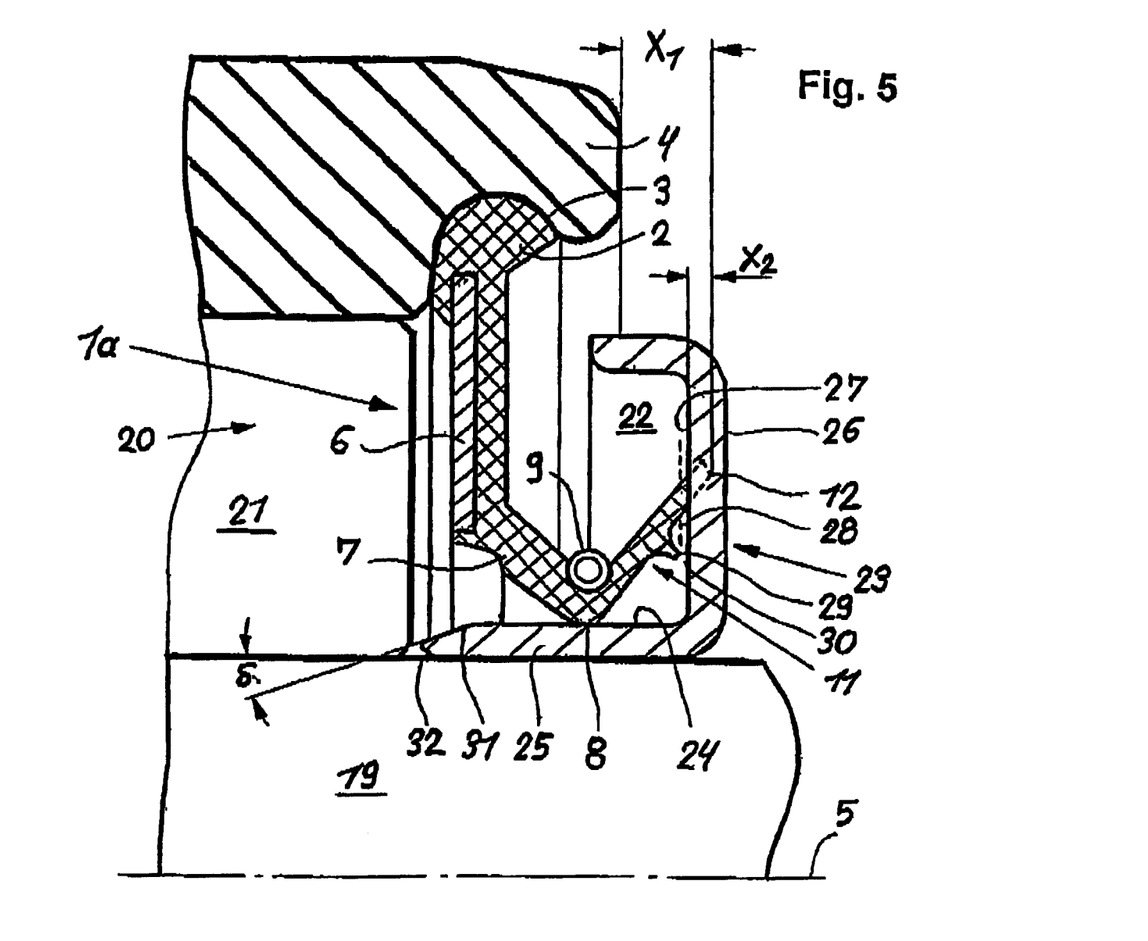
FIG. 5 is a half-section of the lip-type shaft seal of FIG. 1, slightly modified and installed upon a shaft.

FIG. 5 shows a half-section of the lip-type shaft seal 1a of FIG. 1, installed upon a shaft 19, for sealing an annular gap established between the bearing ring 4 and the rotating shaft 19, in particular a pump shaft of a water pump. The shaft seal 1a separates hereby two pressure compartments, one of which is an oil chamber 20 for receiving rolling bodies 21, and the other one is a water chamber 22 for containing coolant, in particular cooling water of an internal combustion engine. The sealing lips 7, 11 of the shaft seal 1a interact with a sleeve-shaped centrifugal member 23 which is securely fixed to and conjointly rotates with the shaft 19. The centrifugal sleeve 23 has a substantially cup-shaped configuration with a cylindrical portion 25, which bears against the outer surface area of the shaft 19, and a radial portion 26, which extends perpendicular to the symmetry axis 5. The sealing edge 8 of the radial sealing lip 7 is urged with force with the assistance of the garter spring 9 against the outer surface area 24 of the cylindrical portion 25 of the centrifugal sleeve 23. The axial sealing lip 11 of the shaft seal 1a bears against the radial portion 26 of the centrifugal sleeve 23.

In order to realize a defined axial overlap $X_2$ between the axial sealing lip 11 and the radial contact surface 27 of the radial portion 26 of the centrifugal sleeve 23, a defined installation position, labeled by the dimension X, is provided between the bearing ring 4 and the centrifugal sleeve 23. The establishment of the axial overlap $X_2$ in conjunction with the constructive measures that relate in particular to the axial sealing lip 11 enable an optimal abutment of the sealing lip 11 against the centrifugal sleeve 23. The resultant support force of the axial sealing lip 11 realizes a sufficient sealing and prevents excessive wear and thus an inadmissibly high heating that would adversely affect the sealing action and the service life of the entire shaft seal 1a and the attached bearing unit. In particular, excessive heating can be avoided by structuring the contact surface 27 at least partially in the area of support of the sealing lip 11. An appropriate structure includes a honeycomb configuration, as indicated by reference numeral 28, which is formed by bumps jutting out from the contact surface 27, or may be embedded axially in the contact surface 27. The resulting decrease of the contact zone between the axial sealing lip 11 and the contact surface 27 reduces friction and permits the inclusion of lubricant that is necessary for formation of an oil film or a lubricating film between the contact surface 27 and the sealing edge 12 of the axial sealing lip 11.

In FIG. 5, the axial sealing lip 11 is provided here on the inside, i.e. in direction of the shaft 19, with a pre-seal in the form of an anterior lip 29 which, when the shaft seal 1a is installed, extends towards the contact surface 27 of the centrifugal sleeve 23 at formation of an annular gap 30 therebetween. The anterior lip 29 and the sealing gap 30 are configured to allow passage of oil while forming a barrier for grease. The provision also positively affects the sealing action because the support surface of the sealing edge 12 is ensured to build up a sufficient oil film while still preventing excessive stress on the sealing edge 12.

Assembly of the shaft seal 1a and the centrifugal sleeve 23 is carried out in succession by placing first the shaft seal 1a into the pocket 3 of the bearing ring 4 before axially inserting the centrifugal sleeve 23. To prevent damage to the radial sealing lip 7 in particular, the cylindrical portion 25 of the centrifugal sleeve 23 is formed with a slanted run-on surface 31. The angle δ by which the run-on surface 31 is beveled is sized to spread apart the radial sealing lip 7 during installation so as to be able to slide onto the outer surface area 24 without risk of destruction. In addition to the slanted run-on surface 31, it is also possible to provide the cylindrical portion 25 of the centrifugal sleeve 23 at the end face with an inner radius 32 to simplify the installation of the centrifugal sleeve 23 in the shaft 19.

Figure 6:
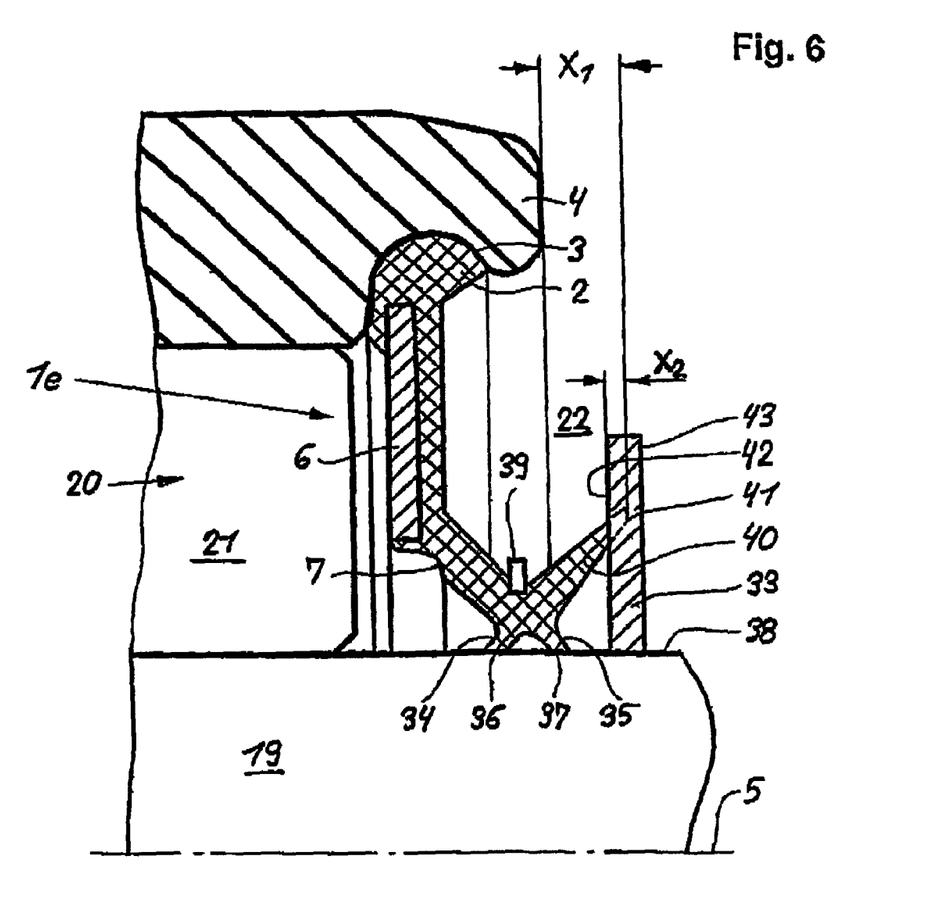
FIG. 6 is a half-section of another embodiment of a lip-type shaft seal according to the present invention, depicting the installed state upon a shaft.

Turning now to FIG. 6, there is shown a half-section of another embodiment of a lip-type shaft seal according to the present invention, generally designated by reference numeral 1e and depicting the installed state thereof upon a shaft 19. Parts corresponding with those in FIG. 1 are denoted by identical reference numerals and not explained again. The description below will center on the differences between the embodiments. The shaft seal 1e has two radial sealing lips 34, 35 which rest via respective sealing edges 36, 37 directly against the outer surface area 38 of the shaft 19. The support force can be increased by providing a radial split retaining ring 39 which is under tension and received in an annular groove of the shaft seal 1e. An axial sealing lip 40 of the shaft seal 1e has a sealing edge 41 which bears against a contact surface 42 of a disk-shaped centrifugal member 43. The centrifugal disk 43 is so securely fixed to the shaft 19 as to establish a defined axial overlap $X_2$ between the sealing edge 41 of the axial sealing lip 40 and the contact surface 42 by positioning the centrifugal disk 43 on the shaft 19 at a distance X, to the bearing ring 4.

Figure 7:
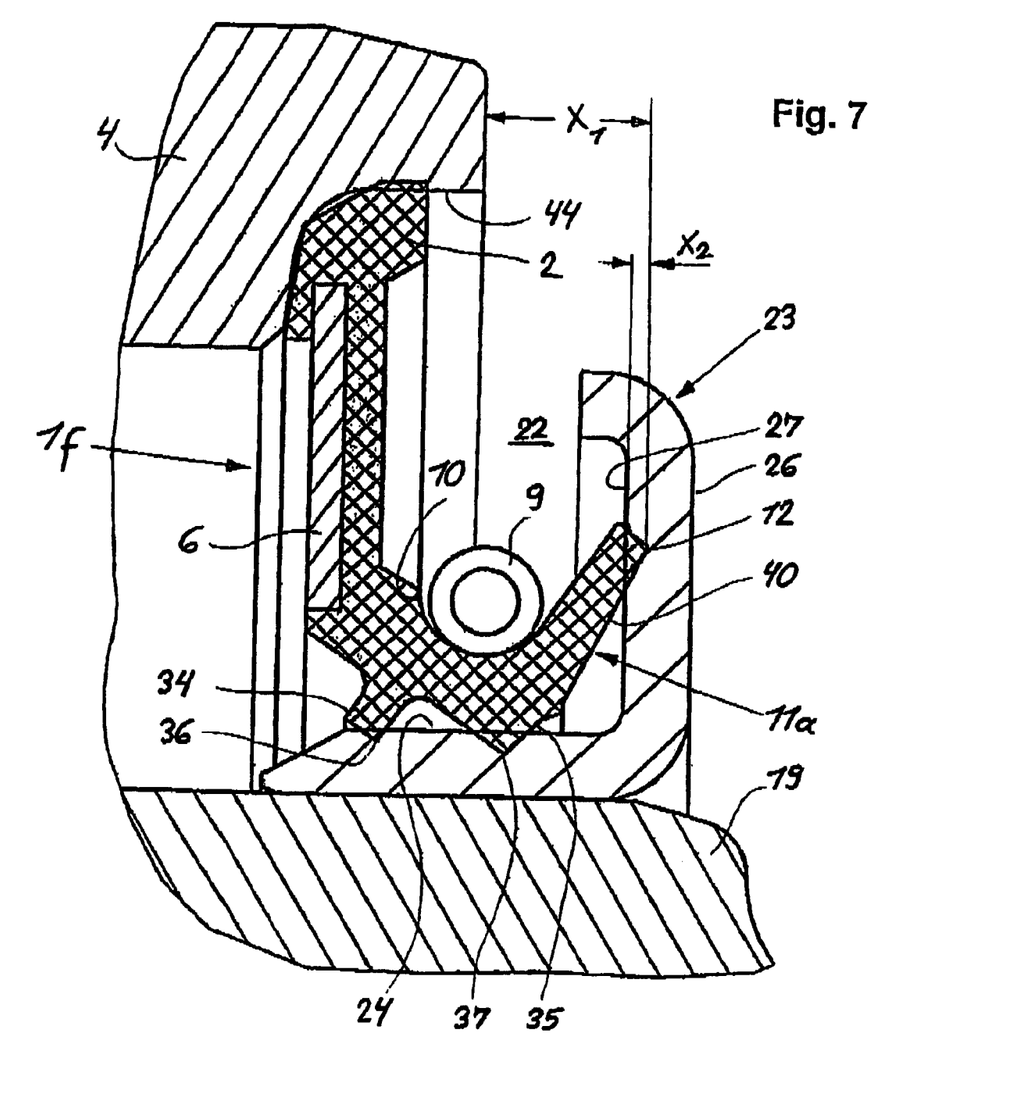
FIG. 7 is a half-section of still another embodiment of a lip-type shaft seal according to the present invention, received in a cylindrical pocket of a bearing ring.

FIG. 7 is a half-section of still another embodiment of a lip-type shaft seal according to the present invention, generally designated by reference numeral 1f. Parts corresponding with those in FIG. 6 are denoted by identical reference numerals and not explained again. The description below will center on the differences between the embodiments. In the shaft seal 1e, the sealing edges 35, 36 of the radial sealing lips 34, 35 are urged with force with the assistance of the garter spring 9 against the outer surface area 24 of the cylindrical portion 25 of the centrifugal sleeve 23. The axial sealing lip 40 of the shaft seal 1a bears against the radial portion 26 of the centrifugal sleeve 23, which is securely fixed onto the outer surface area 24 of the shaft 19. The bulbed portion 2 of the shaft seal 1f is received here in a cylindrical pocket 44 of the bearing ring 4.

Figure 8:
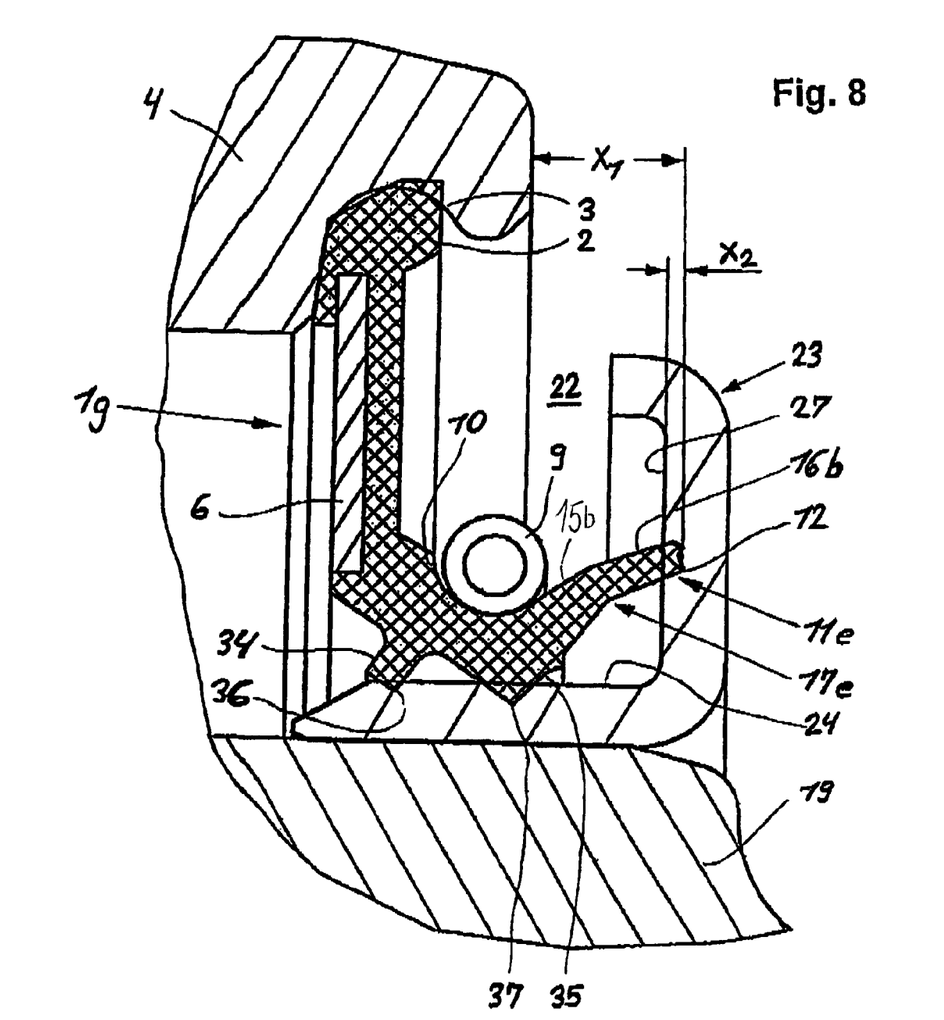
FIG. 8 is a half-section of another variation of a lip-type shaft seal according to the present invention.

FIG. 8 shows a is a half-section of a variation of a lip-type shaft seal according to the present invention, generally designated by reference numeral 1g. Parts corresponding with those in FIG. 7 are denoted by identical reference numerals and not explained again. The description below will center on the differences between the embodiments. This embodiment of the shaft seal 1g combines elements of the shaft seal 1b and the shaft seal 1f and has an axial sealing lip 11e which includes a first lip portion 15b and a second angled lip portion 16b which extends at an angle to the lip portion 15b. Formed between the lip portions 15b, 16b is a bending joint 17e without flute.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A lip-type shaft seal for sealingly separating pressure compartments, in particular for sealing two components movable relative to one another, comprising:
    a seal body defining a symmetry axis and made of elastic material which has a Shore A hardness of ≦75, said seal body having a first radial sealing lip for placement in a pocket and terminating in a second axial sealing lip, said radial sealing lip having a sealing edge and bearing against a rotating component, which extends in a direction of the symmetry axis, said axial sealing lip having a sealing edge which, in installed state, rests against a contact surface oriented radially to the symmetry axis;
    a spring element for urging the sealing edge of the radial sealing lip against the rotating component; and
    a reinforcing element integrated in a radial sealing portion of the seal body so as to be embraced by one side of the sealing portion,
    wherein the axial sealing lip extends at an angle of ≧35° in relation to the symmetry axis, when the axial sealing lip has not been installed yet and is under no tension,
    wherein the axial sealing lip extends from the sealing edge of the radial sealing lip at a length of ≧1.4 mm, when the axial sealing lip has not been installed yet,
    wherein the axial sealing lip rests against the contact surface at an axial overlap of 0.05 to 0.55 mm, when being installed.

2. The shaft seal of claim 1, wherein the axial sealing lip has an angled lip portion at a distance to the sealing edge of the radial sealing lip.

3. The shaft seal of claim 2, wherein the angled lip portion extends with respect to the axial sealing lip at an angle of inclination of ≧60° in relation to a line which is oriented at a right angle to the symmetry axis.

4. The shaft seal of claim 2, wherein the angled lip portion extends at an angle of ascent of ≧40° in relation to a line which is oriented at a right angle to the symmetry axis.

5. The shaft seal of claim 1, wherein the axial sealing lip has a wall thickness which tapers from the sealing edge of the radial sealing lip from ≧0.9 mm to ≧0.2 mm, when the seal body is under no tension.

6. The shaft seal of claim 2, and further comprising a bending joint formed at a junction zone between the angular disposition of the axial sealing lip, on the one hand, and the angle of ascent or angle of inclination of the angled lip portion, on the other hand.

7. The shaft seal of claim 6, wherein the bending joint includes a groove formed in junction zone between the axial sealing lip and the angled lip portion.

8. The shaft seal of claim 7, wherein the groove has a semi-round configuration.

9. The shaft seal of claim 7, wherein the groove is formed on an inside surface of the junction zone and extends in a direction of the symmetry axis.

10. The shaft seal of claim 7, wherein the groove is formed on an outside surface of the axial sealing lip.

11. The shaft seal of claim 7, wherein the groove is a lubricant reservoir.

12. The shaft seal of claim 1, wherein the contact surface has a texture.

13. The shaft seal of claim 12, wherein the contact surface has a honeycomb structure.

14. The shaft seal of claim 1, wherein the axial sealing lip has a textured end surface, wherein at least one of the textured end surface and the sealing edge of the axial sealing lip is constructed for abutment against the contact surface, wherein the contact surface is flat or textured.

15. The shaft seal of claim 1, wherein the sealing edge of the axial sealing lip has an end lined with a wear-inhibiting coating.

16. The shaft seal of claim 15, wherein coating is made of PTEE.

17. The shaft seal of claim 1, wherein the contact surface has at least a predetermined region which is lined with a wear-inhibiting coating.

18. The shaft seal of claim 1, wherein the axial sealing lip has an inside surface formed with a twist element pointing in a direction to the contact surface and toward the symmetry axis for realizing a change in twist.

19. The shaft seal of claim 1, and further comprising a rotating centrifugal member for interaction with the axial sealing lip.

20. The shaft seal of claim 19, wherein the centrifugal member is a centrifugal sleeve or a centrifugal disk.

21. The shaft seal of claim 19, wherein the centrifugal member is securely fixed to the rotating component.

22. The shaft seal of claim 1, wherein the rotating component is a shaft.

23. The shaft seal of claim 21, wherein the centrifugal member has a sleeve-like configuration and includes cylindrical portion in surrounding relationship to the rotating component and a radial portion to define the contact surface for support of the axial sealing lip.

24. The shaft seal of claim 23, wherein the cylindrical portion has an inner surface area which is formed with a slanted run-an surface to enable a sequential assembly of the shaft seal and the centrifugal member.

25. The shaft seal of claim 1, wherein at least one of the radial sealing lip and the axial sealing lip has two or more of said sealing edge.

26. The shaft seal of claim 1, wherein the axial sealing lip has an anterior lip which is sized to extend toward the contact surface so as to define a gap between the anterior lip and the contact surface, when the shaft seal is assembled.

27. The shaft seal of claim 1, wherein the spring is a garter spring in surrounding relationship to the radial sealing lip and defined by a diameter, said garter spring being received in an annular groove of a diameter, wherein $$\frac{D_0}{D} \geq 1.1,$$

with $D_0$ being the diameter of the groove and $D$ being the diameter of the garter spring.

28. The shaft seal of claim 27, wherein the diameter of the garter spring is $\leq 1.3$ mm.

29. The shaft seal of claim 27, wherein the diameter of the garter spring is $\leq 1.1$ mm.

30. The shaft seal of claim 1, and further comprising a split retaining ring which is under tension in radial direction and surrounds the radial sealing lip.

31. The shaft seal of claim 30, wherein the retaining ring has a rectangular shape.

32. The shaft seal of claim 1, wherein the seal body is made of elastomer.

33. The shaft seal of claim 32, wherein the seal body is made of HNBR.

34. The shaft seal of claim 1, wherein the seal body is made of fluorocarbon rubber.

35. The shaft seal of claim 1, wherein the seal body is made of fluorocarbon rubber selected from the group consisting of FPM and FKM.

36. The shaft seal of claim 1 for use as seal for a rolling-contact bearing in a water circulating pump of an internal combustion engine, wherein the sealing edge of the radial seal body is supported directly on the rotating component.

37. The shaft seal of claim 23 for use as seal for a rolling-contact bearing in a water circulating pump of an internal combustion engine, wherein the sealing edge of the radial seal body is supported directly on the cylindrical portion of the centrifugal member, and the axial sealing lip is supported on the radial contact surface of the centrifugal member.

* * * * *